(12) United States Patent
Furukawa

(10) Patent No.: US 11,715,098 B2
(45) Date of Patent: Aug. 1, 2023

(54) INFORMATION MANAGEMENT SYSTEM, INFORMATION MANAGEMENT METHOD, AND PROGRAM RECORDING MEDIUM

(71) Applicant: NEC Corporation, Tokyo (JP)

(72) Inventor: Ryo Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1016 days.

(21) Appl. No.: 16/487,140

(22) PCT Filed: Mar. 7, 2017

(86) PCT No.: PCT/JP2017/009022
§ 371 (c)(1),
(2) Date: Aug. 20, 2019

(87) PCT Pub. No.: WO2018/163289
PCT Pub. Date: Sep. 13, 2018

(65) Prior Publication Data
US 2019/0378122 A1    Dec. 12, 2019

(51) Int. Cl.
*G06Q 40/06* (2012.01)
*G06Q 20/38* (2012.01)
(Continued)

(52) U.S. Cl.
CPC ......... *G06Q 20/381* (2013.01); *G06Q 20/065* (2013.01); *G06Q 20/10* (2013.01);
(Continued)

(58) Field of Classification Search
CPC .... G06Q 20/381; G06Q 20/065; G06Q 20/10; G06Q 20/201; G06Q 20/3274; G06Q 20/401
See application file for complete search history.

(56) References Cited

U.S. PATENT DOCUMENTS

| | | | |
|---|---|---|---|
| 2010/0145861 A1* | 6/2010 | Law | G06Q 30/0601 705/40 |
| 2011/0218868 A1 | 9/2011 | Young et al. | |
| 2016/0379298 A1* | 12/2016 | Isaacson | G06Q 30/0633 705/26.62 |

FOREIGN PATENT DOCUMENTS

| | | |
|---|---|---|
| JP | H09-311891 A | 12/1997 |
| JP | 2002-230450 A | 8/2002 |

(Continued)

OTHER PUBLICATIONS

Mauro Conti, Sandeep Kumar E, Chhagan Lal, and Sushmita Ruj, A Survey on Security and Privacy Issues of Bitcoin, Dec. 2017, IEEE, web, 1-10 (Year: 2017).*

(Continued)

*Primary Examiner* — I Jung Liu

(57) ABSTRACT

Provided is an information management system that comprises: a payment information confirmation device which is connected over a network to a cryptocurrency system management terminal that manages a cryptocurrency system, which extracts transaction information including address information for a seller account in a cryptocurrency system, and which generates and transmits payment confirmation information including at least a transfer amount from the extracted transaction information; and a register device which is connected to the payment information confirmation device, receives the payment confirmation information from the payment information confirmation device, displays the received payment confirmation information, converts the currency units of an entered transaction amount into a cryptocurrency units payment amount in the currency units of the cryptocurrency system, generates a two-dimensional code in which are recorded the cryptocurrency units payment amount and the address information, and displays the generated two-dimensional code.

10 Claims, 13 Drawing Sheets

(51) Int. Cl.
G06Q 20/06 (2012.01)
G06Q 20/32 (2012.01)
G06Q 20/40 (2012.01)
G06Q 20/10 (2012.01)
G06Q 20/20 (2012.01)

(52) U.S. Cl.
CPC ....... G06Q 20/201 (2013.01); G06Q 20/3274 (2013.01); G06Q 20/401 (2013.01)

(56) References Cited

FOREIGN PATENT DOCUMENTS

| | | | |
|---|---|---|---|
| JP | 2011-243005 A | 12/2011 | |
| JP | 2013-521573 A | 6/2013 | |
| JP | 2016-162431 A | 9/2016 | |
| JP | 2016-173752 A | 9/2016 | |
| KR | 2031711 B1 * | 10/2019 | ........... G06Q 20/065 |
| WO | 2007/018119 A1 | 2/2007 | |
| WO | 2010/013296 A1 | 2/2010 | |
| WO | 2016/103373 A1 | 6/2016 | |

OTHER PUBLICATIONS

Nakamoto, "Bitcoin: A Peer-to-Peer Electronic Cash System", [online], accessed on Feb. 14, 2017, retrieved from the Internet <URL: https://bitcoin.org/bitcoin.pdf>, 9 pages total.

International Search Report dated May 9, 2017 issued by the International Searching Authority in international application PCT/JP2017/009022.

Written Opinion dated May 9, 2017 issued by the International Searching Authority in international application PCT/JP2017/009022.

* cited by examiner

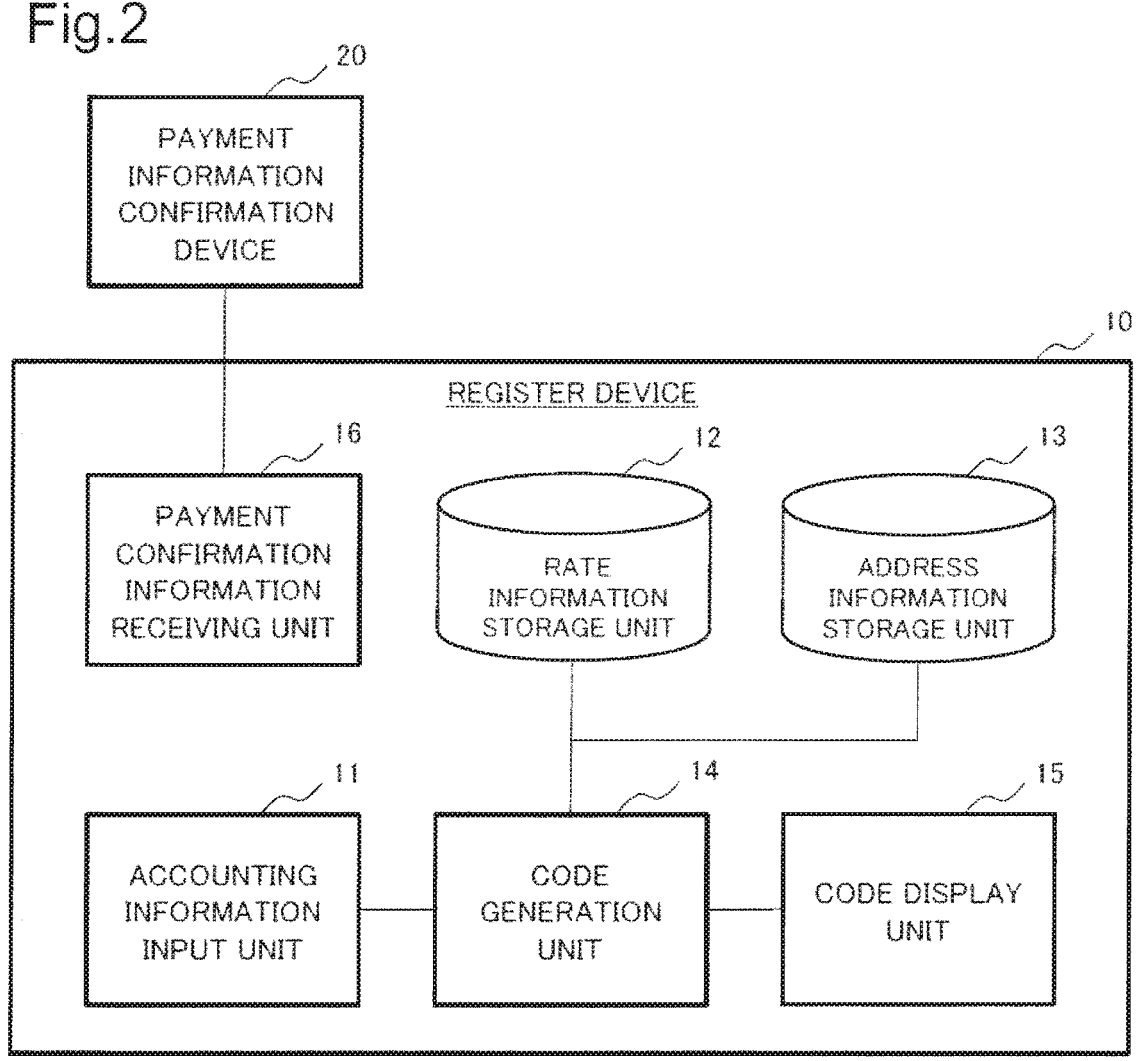

240 REGISTER INFORMATION

| REGISTER IDENTIFICATION INFORMATION | REGISTER ADDRESS |
|---|---|
| REGISTER 1 | 128.0.0.10 |
| REGISTER 2 | 128.0.0.11 |
| REGISTER 3 | 128.0.0.12 |
| ... | ... |

INFORMATION MANAGEMENT SYSTEM, INFORMATION MANAGEMENT METHOD, AND PROGRAM RECORDING MEDIUM

This application is a National Stage Entry of PCT/JP2017/009022 filed on Mar. 7, 2017, the contents of all of which are incorporated herein by reference, in their entirety.

TECHNICAL FIELD

The present invention relates to an information management system for managing point-of-sales information, an information management method, and a program recording medium.

BACKGROUND ART

As typically exemplified by Bitcoin, a cryptocurrency system managed by a peer-to-peer (P2P) network that any person can take part in without requiring a central management server has been widely spread in recent years (NPL 1). In such a cryptocurrency system, any person can freely create an account equivalent to a bank account.

For example, in the case of Bitcoin, an account can be created by generating a key pair formed of a secret key and a public key in an elliptic curve cryptography. In the case of Bitcoin, the public key or a hash value of the public key functions as an address of an account of a user, and a remittance can be made to a user by specifying the address. The secret key is used for generating an electronic signature in order to certify ownership of the account when cryptocurrency associated with the account is used. For example, in a case where a remittance is executed from a user A to a user B, information acquired by adding an electronic signature of the user A to remittance information containing the address of the account of the user B and an amount of remittance (hereinafter, referred to as transaction information), is transmitted to a cryptocurrency system. A public key of the user A is open to public in a form of an address of the account, and hence any person can verify that the user A owns the account holding the cryptocurrency that has been used for payment.

As described above, any person can freely own an account and freely execute a remittance, and hence the cryptocurrency system has such advantage that a user who cannot own a bank account can execute a remittance or payment, or payment can be executed beyond borders without currency exchange to local currency.

Payment by cryptocurrency has been widely used not only in a commercial transaction through the Internet but also in a transaction at a retail shop. Sale of goods by cryptocurrency is executed by transmitting, to any node forming the cryptocurrency system, transaction information on a remittance to an account of a distributor through use of a terminal such as a smartphone and a personal computer. In order for the terminal to generate the transaction information, at least address information on the remittee and an amount of remittance are required. Further, the distributor can confirm the payment by accessing any node constituting the cryptocurrency system and confirming that the transaction information is recorded in the cryptocurrency system.

In many cases, a point-of-sales information management system (hereinafter, referred to as a POS system) is used for managing merchandise information in sale of goods at a retail shop. The POS system accumulates and manages information relating to a commercial transaction, such as an item, the number and a price of the item, date and time, and purchasers when the item is sold. In the POS system, registers performing accounting processing are connected via a network, and information on sale of goods performed by the registers is gathered. Some of the registers include a display for displaying information acquired by reading bar codes attached to items and summing up a payment amount of the purchased items. A user can complete purchase of the items by paying the payment amount displayed on the display.

In order to use cryptocurrency in sale of goods at a retail shop, it is required to convert a payment amount displayed on a register into cryptocurrency, based on a rate, input an address of the shop and the payment amount to a terminal, generate transaction information, and transmit the transaction information. However, in many cases, an address of an account in the cryptocurrency system is a very long character string, and there is no way of confirming whether a remittance amount is correct. Thus, it is difficult to generate correct transaction information.

In order to solve this problem, a cryptocurrency payment support terminal that converts a payment amount into cryptocurrency, generates a quick response (QR) code (registered trademark) in which information on the payment amount and an address of a remittee is recorded, and displays the QR code, is used. At the time of purchasing an item, a user causes the cryptocurrency payment support terminal to read a displayed QR code, generate transaction information, and transmit the transaction information. Such a cryptocurrency payment support terminal also confirms transaction information required on a shop side, and hence it is required to access a node constituting the cryptocurrency system through the Internet.

However, from a standpoint of security, a register in the POS system is connected to a local network, but not to the Internet in many cases. Thus, it is difficult to integrate functions of the cryptocurrency payment support terminal and the register. As a result, in order to execute cryptocurrency payment at a retail shop, it is required to prepare two terminals, being the cryptocurrency payment support terminal and the register in the POS system.

PTL 1 discloses an electronic account settlement system which includes a database for managing accounts for money reception/payment information on users and a settlement server for executing settlement processing between the users, and executes electronic account settlement processing between the users via a communication network. When receiving a settlement request from a communication terminal via the communication network, the system in PTL 1 executes electronic money settlement processing as a primary settlement between the users with reference to the accounts on the database.

PTL 2 discloses an information processing device that can join, as a node, a P2P network configured in such a way that cryptocurrency transactions take place among a plurality of nodes through use of cryptocurrency addresses. When a cryptocurrency transaction is executed via the P2P network between a user terminal and a contributor terminal that use contents, the device in PTL 2 confirms payment at a cryptocurrency price, based on transaction data of cryptocurrency by the user terminal in the P2P network.

CITATION LIST

Patent Literature

[PTL 1] International Publication WO 2007/018119

[PTL 2] Japanese Unexamined Patent Application Publication No. 2016-162431

Non Patent Literature

[NPL 1] S. Nakamoto, "Bitcoin: A Peer-to-Peer Electronic Cash System," [online], accessed on Feb. 14, 2017, retrieved from the Internet <URL: https://bitcoin.org/bitcoin.pdf>

SUMMARY OF INVENTION

Technical Problem

In general, in order to facilitate payment by cryptocurrency at a shop such as a retail shop without degrading security of a register, two terminals, being a cryptocurrency payment support terminal and a register of a point-of-sales information management system, are required at each sales counter. Thus, there is a problem that a payment procedure on the shop side is complicated.

In the system in PTL 1, settlement processing is executed through an account database by being divided into primary settlement processing and secondary settlement processing. Thus, according to the system in PTL 1, operations executed by a seller and a purchaser are completed only by executing the primary settlement processing, thereby simplifying a payment procedure on the shop side. However, the system in PTL 1 needs to involve a financial institution or the like as a third party organization. As a result, there is a problem that an advantageous point of the cryptocurrency system, that is, a direct transaction between a purchaser and a seller without involving a third party organization, cannot be utilized.

The device in PTL 2 intermediates transaction of cryptocurrency between a contributor terminal and a user terminal via the P2P network. Thus, according to the device in PTL 2, the cryptocurrency transaction between the contributor terminal and the user terminal is simplified. However, with the method in PTL 2, the contributor terminal and the user terminal are directly connected to the P2P network, and hence there is a problem that the device in PTL 2 cannot be adopted to a POS system which is used without being connected to the Internet from a standpoint of security.

An object of the present invention is to provide an information management system which can solve the above-mentioned problems and can execute payment by cryptocurrency in a simpler manner at a high security level.

Solution to Problem

An information management system according to one aspect of the present invention includes: a payment information confirmation device which is connected, via a network, to a cryptocurrency system management terminal managing a cryptocurrency system, extracts transaction information containing address information of an account of a vendor in the cryptocurrency system, and generates and transmits payment confirmation information containing at least a remittance amount from the extracted transaction information; and a register device which is connected to the payment information confirmation device, receives the payment confirmation information from the payment information confirmation device, displays the received payment confirmation information, converts a currency unit of an input transaction amount into a cryptocurrency unit payment amount of a currency unit in the cryptocurrency system, generates a two-dimensional code in which the cryptocurrency unit payment amount and the address information are recorded, and displays the generated two-dimensional code.

An information management method according to one aspect of the present invention includes: converting a currency unit of an input transaction amount into a cryptocurrency unit payment amount of a currency unit in a cryptocurrency system; generating a two-dimensional code in which the cryptocurrency unit payment amount and address information of an account of a vender in the cryptocurrency system are recorded; displaying the generated two-dimensional code; extracting transaction information containing the address information via a network; generating payment confirmation information containing at least a remittance amount from the extracted transaction information; and displaying the generated payment confirmation information.

A program recording medium according to one aspect of the present invention records a program causing a computer to execute: processing of converting a currency unit of an input transaction amount into a cryptocurrency unit payment amount of a currency unit in a cryptocurrency system; processing of generating a two-dimensional code in which the cryptocurrency unit payment amount and address information of an account of a vender in the cryptocurrency system are recorded; processing of displaying the generated two-dimensional code; processing of extracting transaction information containing the address information via a network; processing of generating payment confirmation information containing at least a remittance amount from the extracted transaction information; and processing of displaying the generated payment confirmation information.

Advantageous Effects of Invention

According to the present invention, an information management system which can execute payment by cryptocurrency in a simpler manner at a high security level can be provided.

BRIEF DESCRIPTION OF DRAWINGS

FIG. 2 is a block diagram illustrating a configuration example of a register device in the information management system according to the first example embodiment of the present invention.

FIG. 3 is a schematic diagram illustrating one example of accounting information that is input to an accounting information input unit of the register device in the information management system according to the first example embodiment of the present invention.

EXAMPLE EMBODIMENT

Figure 1:
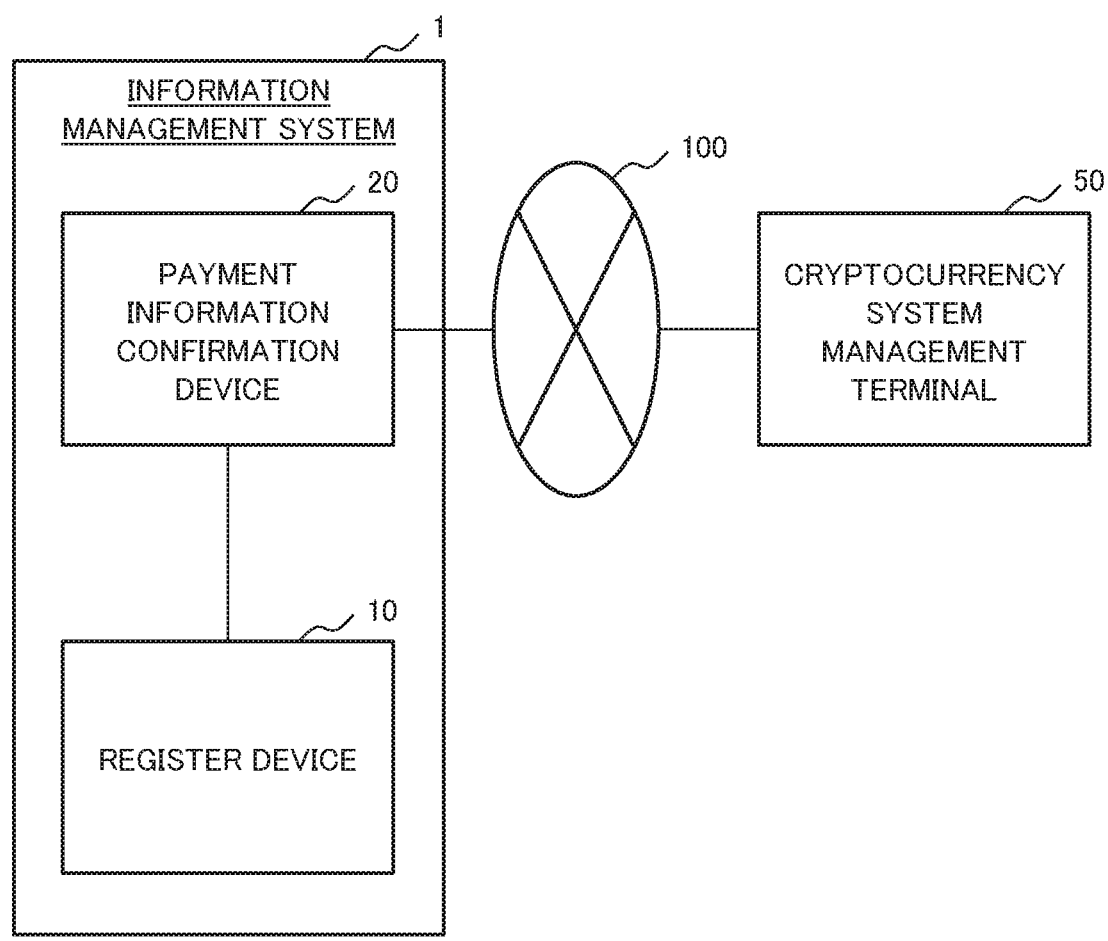
FIG. 1 is a block diagram illustrating a configuration example of an information management system according to a first example embodiment of the present invention.

With reference to the drawings, description on embodiments for carrying out the present invention is made below. In the following example embodiments, although limitations technically preferred for carrying out the present invention are given, the scope of the present invention is not limited to the following. Note that, in all the drawings used for description in the following example embodiments, similar portions are denoted with the same reference symbols unless otherwise specified. Further, in the drawings used for the following description, description of a configuration of a part irrelevant to description of the present invention may be omitted and not illustrated in some cases. Further, in the following example embodiments, repeated description may be omitted for similar configurations and operations.

First Example Embodiment (Configuration)

First, with reference to the drawings, description is made on a configuration of an information management system according to a first example embodiment of the present invention. The information management system according to the present example embodiment enables cryptocurrency payment in a point-of-sales (POS) information management system (also referred to as a POS system).

FIG. 1 is a block diagram illustrating a configuration of an information management system 1 according to the present example embodiment. As in FIG. 1, the information management system 1 according to the present example embodiment includes a register device 10 and a payment information confirmation device 20. The information management system 1 is connected to a cryptocurrency system management terminal 50 via a network 100 such as the Internet.

The register device 10 converts a currency unit of an input transaction amount into a unit in a cryptocurrency system, and generates a two-dimensional code in which the transaction amount converted into the unit in the cryptocurrency system and address information on an account of a vendor in the cryptocurrency system are recorded. The two-dimensional code is a code in which the information is recorded in a two-dimensional graphic pattern. The two-dimensional code is captured as an image by a camera of a user terminal such as a smartphone and a mobile phone, and is coded by software of the user terminal.

For example, as the two-dimensional code, a matrix type two-dimensional code such as a QR Code (trademark), AztecCode, Semacode, DataMatrix, MaxiCode, and VeriCode may be adopted. Further, a stack type two-dimensional code such as Code49 and PDF417 may be adopted. However, the two-dimensional code is not limited to the above-mentioned examples as long as information, which relates to the transaction amount converted into the unit in the cryptocurrency system, the address information on the account of the vendor in the cryptocurrency system, and the like can be recorded.

The two-dimensional code generated by the register device 10 is read by a camera mounted to, for example, the user terminal. When the transaction information is generated appropriately, the user terminal transmits the transaction information to the cryptocurrency system management terminal 50 that manages the cryptocurrency system.

Further, the register device 10 receives payment confirmation information containing the payment amount by the cryptocurrency from the cryptocurrency system management terminal 50. An employee of the vendor determines whether the cryptocurrency payment amount contained in the payment confirmation information received by the register device 10 matches with a cryptocurrency payment amount that is actually required.

The payment information confirmation device 20 is connected to the cryptocurrency system management terminal 50, and extracts transaction information based on the address information of the account of the vendor in the cryptocurrency system. The payment information confirmation device 20 generates payment confirmation information containing at least a remittance amount based on the extracted transaction information. The payment information confirmation device 20 transmits the generated payment confirmation information to the register device 10.

The cryptocurrency system management terminal 50 is a terminal for managing the cryptocurrency system. The cryptocurrency system management terminal 50 is connected to the payment information confirmation device 20, and transmits the transaction information, which is extracted based on the address information of the vendor, to the payment information confirmation device 20.

<Register Device>

FIG. 2 is a block diagram illustrating a configuration of the register device 10. As in FIG. 2, the register device 10 includes an accounting information input unit 11, a rate information storage unit 12, an address information storage unit 13, a code generation unit 14, a code display unit 15, and a payment confirmation information receiving unit 16.

The accounting information input unit 11 inputs accounting information that associates at least one item that a user purchases with a price of the item. FIG. 3 is one example of the accounting information (accounting information 110) that is input by the accounting information input unit 11. In the accounting information 110 in FIG. 3, an item A, an item B, and an item C are associated with a price of 100 yen, a price of 200 yen, and a price of 300 yen, respectively.

The accounting information input unit 11 input accounting information acquired by reading a bar code or accounting information input by operating item information that is registered to a button of a register. Further, the accounting information may contain information on a purchase date and time and age and sex of a purchaser and the like in addition to the prices of the items.

The rate information storage unit 12 stores information on a conversion rate between currency that the vendor uses and the cryptocurrency.

The conversion rate information stored in the rate information storage unit 12 contains information on a conversion rate of at least one pair of currency and the cryptocurrency. Further, in the rate information storage unit 12, information on conversion rates between a plurality of currencies and the cryptocurrency may be stored. A method of expressing the conversion rate information is not limited as long as conversion between the currency and the cryptocurrency can be performed. Further, in the rate information storage unit 12, conversion rate information may be manually input and stored in advance, or conversion rate information that is acquired by the payment information confirmation device 20 from the Internet may be stored.

Figure 4:
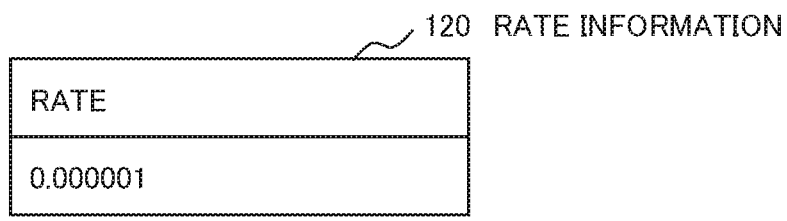
FIG. 4 is a schematic diagram illustrating one example of rate conversion information stored in a rate information storage unit in the information management system according to the first example embodiment of the present invention.

For example, the rate information storage unit 12 stores rate information 120 as in FIG. 4. The rate information 120 in FIG. 4 indicates information on a conversion rate of cryptocurrency Bitcoin with respect to 1 yen. That is, based on the rate information 120, 1 yen is equivalent to 0.000001 unit of the cryptocurrency. For example, when the accounting information 110 in FIG. 3 is input, a total amount to be paid is 600 yen, and hence a cryptocurrency payment amount is 0.0006 unit of the cryptocurrency.

Figure 5:
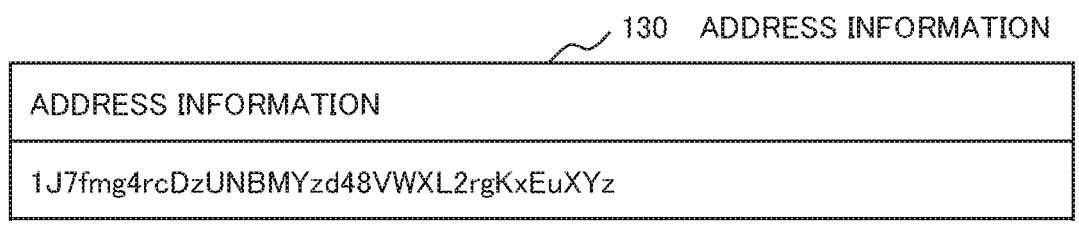
FIG. 5 is a schematic diagram illustrating one example of address information stored in an address information storage unit in the information management system according to the first example embodiment of the present invention.

The address information storage unit 13 (also referred to as a first address information storage means) stores at least one address of the account of the vendor in the cryptocurrency system. For example, the address information storage unit 13 stores address information 130 as in FIG. 5.

The code generation unit 14 determines a payment amount in the cryptocurrency unit by converting a currency unit contained in the input accounting information into a currency unit in the cryptocurrency system based on the conversion rate stored in the rate information storage unit 12. Further, the code generation unit 14 generates a two-dimensional code in which at least the determined payment amount in the cryptocurrency unit and the address information stored in the address information storage unit 13 are recorded.

For example, the code generation unit 14 generates a QR code as a two-dimensional code. The QR code may contain information for identifying the transaction and the like in addition to the cryptocurrency payment amount and the address information. However, the two-dimensional code generated by the code generation unit 14 is not limited to a QR code.

For example, the code generation unit 14 generates a QR code by converting the cryptocurrency payment amount and the address information contained in the address information 130 into character string information in a form of an object notation in JavaScript (trademark). For example, the code generation unit 14 generates a QR code by converting the cryptocurrency payment amount (0.0006 unit of the cryptocurrency) and the address information contained in the address information 130 into character string information in JavaScript Object Notation (JSON) as in the following. {"address": "1J7fmg4rcDzUNBMYzd48VWXL2rgKxEuXYz", "payment": "0.0006BTC"}

The code display unit 15 displays the two-dimensional code generated by the code generation unit 14.

The code display unit 15 may display the two-dimensional code on a monitor screen (not shown) provided to the register device 10, or may print the two-dimensional code onto a paper medium. A method of displaying the two-dimensional code is not particularly limited. The user who purchases an item reads the two-dimensional code displayed by the code display unit 15 with, for example, a user terminal (not shown) including a camera. When the transaction information is generated appropriately, the user terminal transmits the transaction information to the cryptocurrency system management terminal 50.

Figure 6:
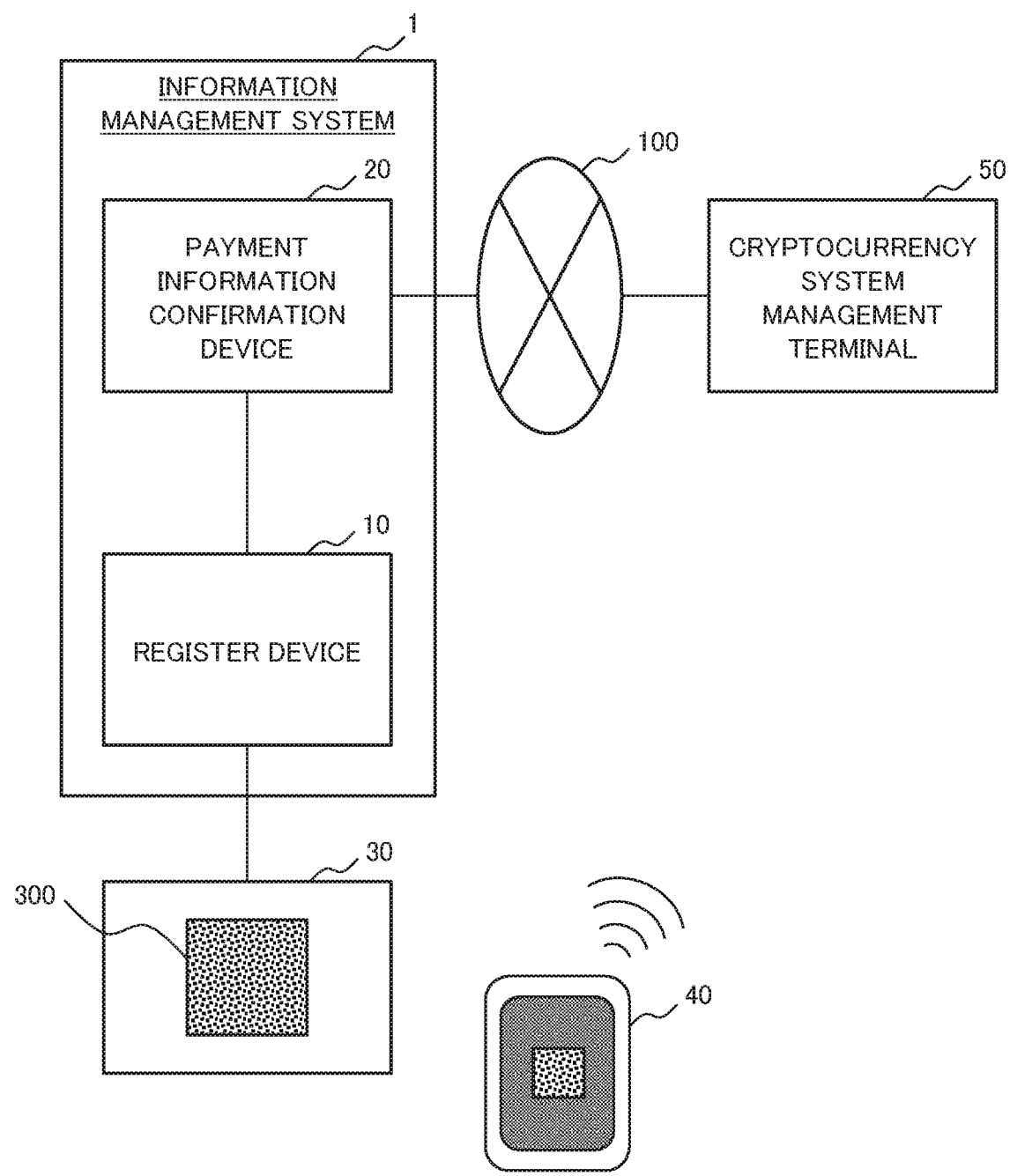
FIG. 6 is a schematic diagram illustrating an example in which transaction information is transmitted to a cryptocurrency system management terminal, the transaction information generated by reading a two-dimensional code, which is generated by the register device in the information management system according to the first example embodiment of the present invention, with a terminal of a user.

FIG. 6 is a schematic diagram illustrating an example in which transaction information is transmitted to the cryptocurrency system management terminal 50, the transaction information generated by reading a two-dimensional code 300, which is generated by the register device 10 in the information management system 1, with a user terminal 40. The user terminal 40 and the cryptocurrency system management terminal 50 may be communicated with each other through wireless communication via a relay station such as a base station.

In the example in FIG. 6, the two-dimensional code 300 generated by the register device 10 is displayed on a monitor screen 30, and the two-dimensional code 300 displayed on the monitor screen 30 is read with a camera of the user terminal 40. The user terminal 40 having read the two-dimensional code 300 decodes information contained in the two-dimensional code 300, and generates transaction information. When the transaction information is generated appropriately, the user terminal 40 transmits the transaction information to the cryptocurrency system management terminal 50. Note that, a monitor screen 300 may be included in the information management system 1, or may not be included in the information management system 1.

The payment confirmation information receiving unit 16 receives payment confirmation information, which contains a confirmation result of the payment by the cryptocurrency, from the payment information confirmation device 20. For example, the payment confirmation information receiving unit 16 displays the received payment confirmation information on the monitor screen 30. The employee of the vendor confirms the payment confirmation information, which is received by the payment confirmation information receiving unit 16 of the register device 10, on the monitor screen 30, and determines whether the cryptocurrency payment amount contained in the payment confirmation information matches with a cryptocurrency payment amount that is actually required. When it is determined that the cryptocurrency payment amount contained in the payment confirmation information matches with the cryptocurrency payment amount that is actually required, the transaction is concluded.

<Payment Information Confirmation Device>

Figure 7:
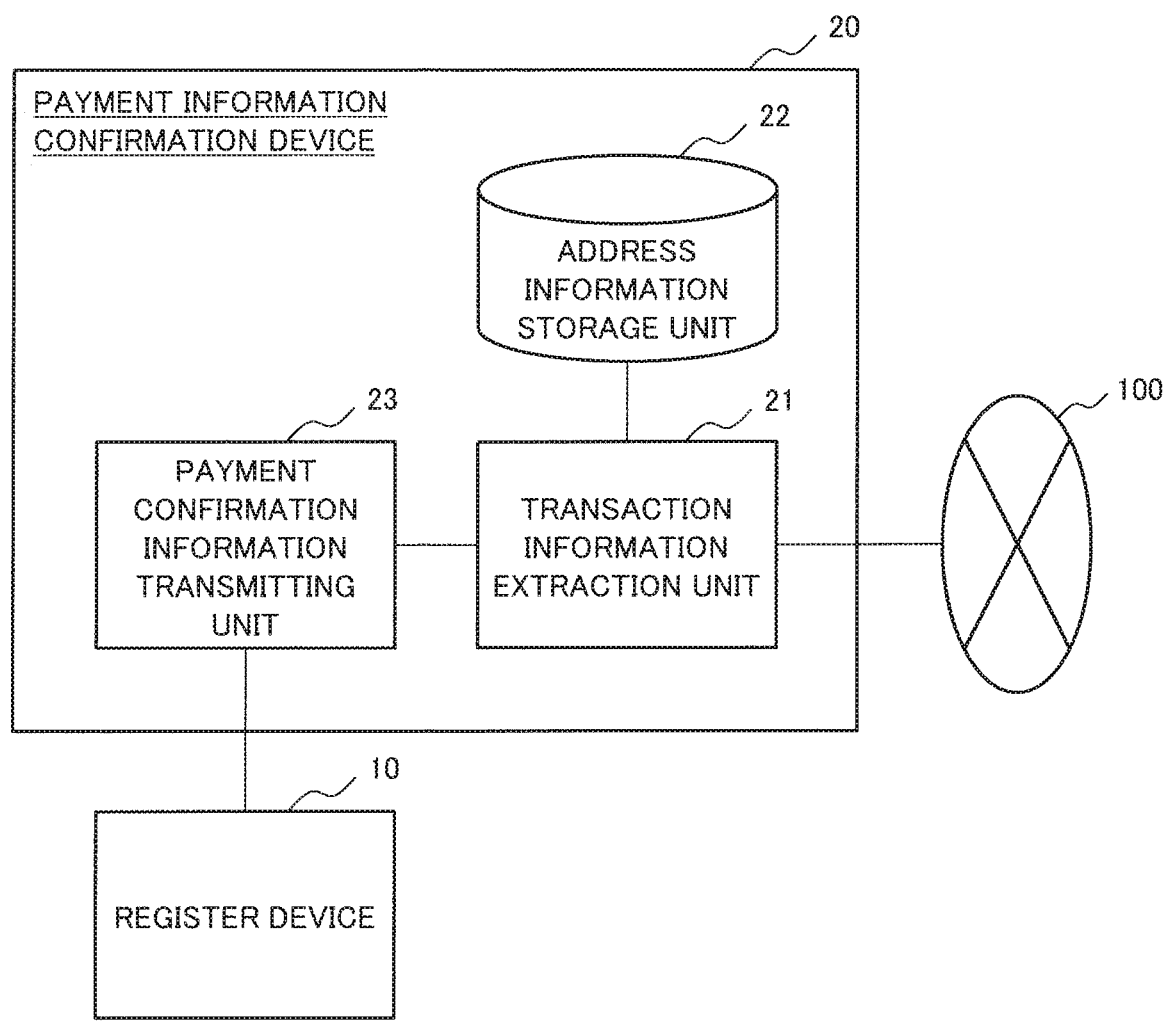
FIG. 7 is a block diagram illustrating a configuration example of a payment information confirmation device in the information management system according to the first example embodiment of the present invention.

FIG. 7 is a block diagram illustrating a configuration of the payment information confirmation device 20. As in FIG. 7, the payment information confirmation device 20 includes a transaction information extraction unit 21, an address information storage unit 22, and a payment confirmation information transmitting unit 23.

The transaction information extraction unit 21 is connected to the cryptocurrency system management terminal 50 via the network 100. The transaction information extraction unit 21 extracts payment transaction information for the vendor based on at least the address information.

The transaction information extraction unit 21 may request the cryptocurrency system management terminal 50 to acquire only transaction information to the address information on a regular basis. Further, the transaction information extraction unit 21 may join the cryptocurrency system as a terminal that manages the cryptocurrency system, and may extract corresponding transaction information locally through use of the address information whenever the transaction information is broadcasted.

Further, the transaction information extraction unit 21 may save an identifier of transaction information that is previously confirmed and a date and time on which transaction information is previously extracted. The transaction information extraction unit 21 is required to extract only new transaction information by eliminating transaction information having an overlapping identifier or eliminating transaction information before the date and time of extraction of the transaction information.

For example, the transaction information extraction unit 21 extracts transaction in which "0.0006 unit of the cryptocurrency" is payed to an address of "1J7fmg4rcDzUNBMYzd48VWXL2rgKxEuXYz" by sending a request to the cryptocurrency system management terminal 50.

The address information storage unit 22 (also referred to as a second address information storage means) stores the address of the account of the vender in the cryptocurrency system management terminal 50.

The payment confirmation information transmitting unit 23 generates payment confirmation information containing at least a remittance amount from the extracted transaction information via a local network of the information management system 1. The payment confirmation information transmitting unit 23 transmits the generated payment confirmation information to the register device 10.

For example, the payment confirmation information transmitting unit 23 may cause the payment confirmation information to contain information such as a date and time of generating the transaction information or a payment number recorded in the transaction information. The payment number recorded in the transaction information functions as an identifier of the transaction information. Further, the payment confirmation information transmitting unit 23 may directly transmit the transaction information as payment confirmation information to a register. For example, the payment confirmation information transmitting unit 23 transmits, as payment confirmation information, that the cryptocurrency payment amount is "0.0006 unit of the cryptocurrency" the payment confirmation information receiving unit 16 of the register device 10.

The configuration of the information management system according to the present example embodiment is described above.

(Operation)

Figure 8:
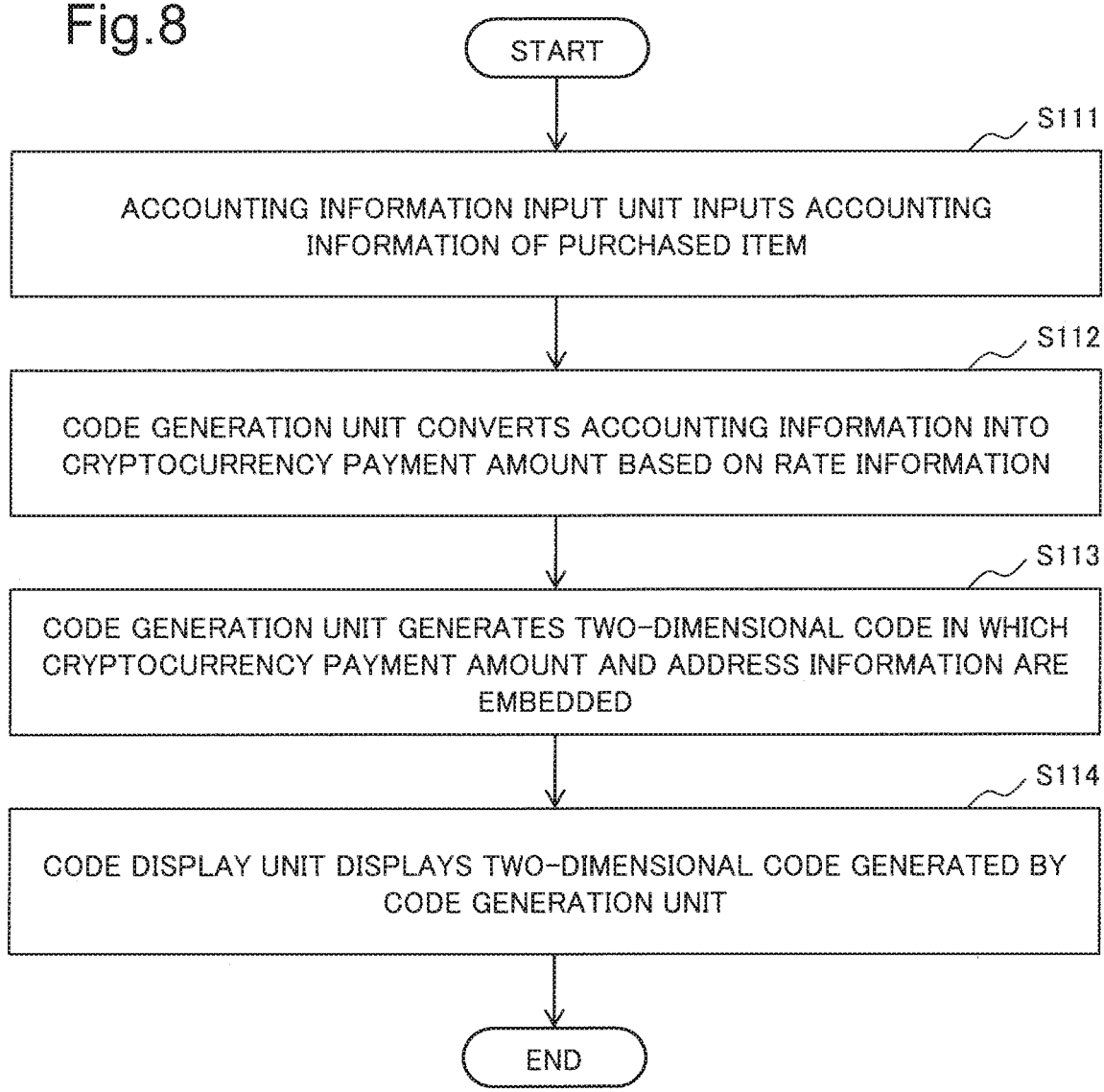
FIG. 8 is a flowchart relating to an operation of displaying a two-dimensional code for supporting cryptocurrency payment in the information management system according to the first example embodiment of the present invention.
Figure 9:
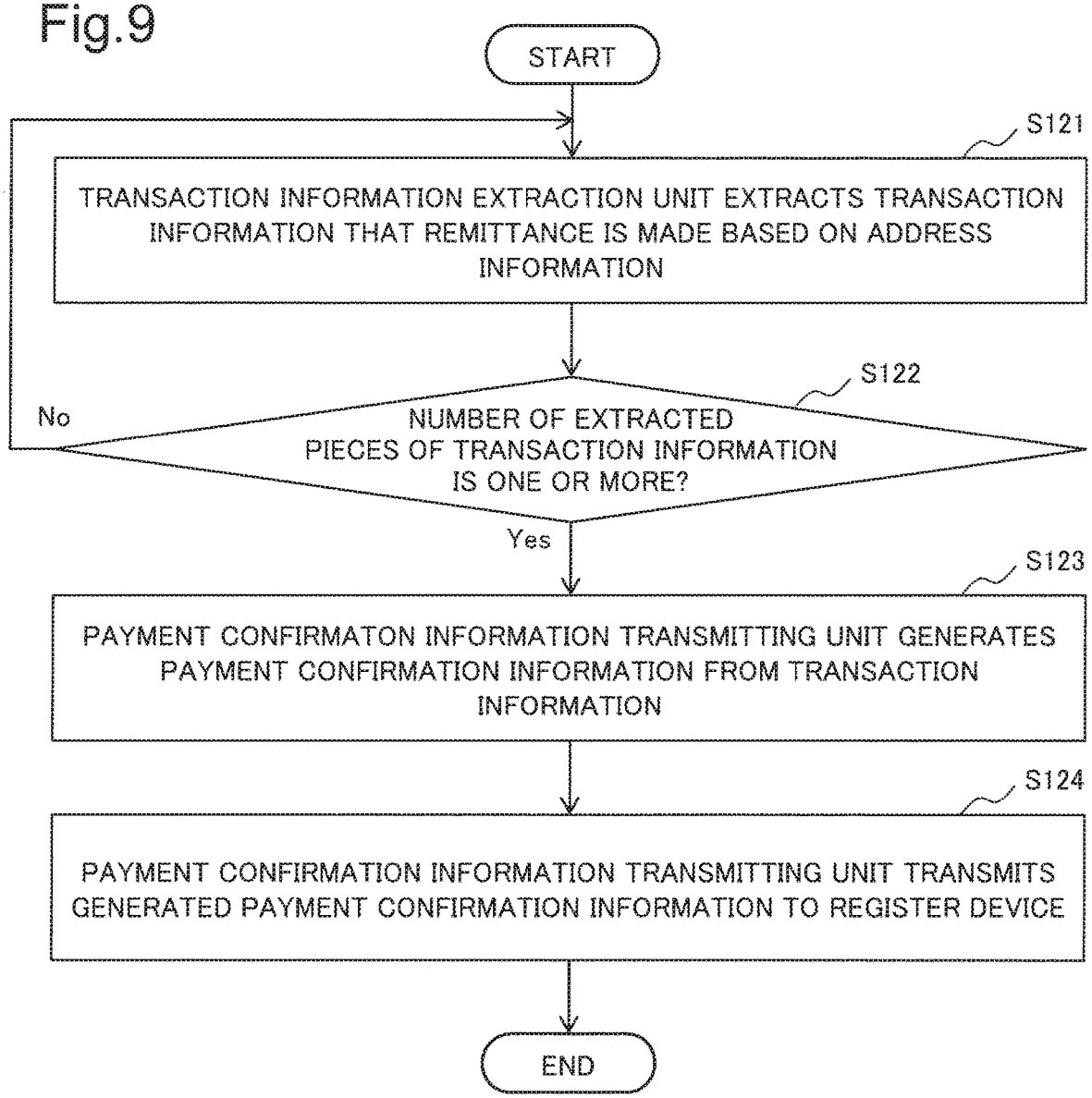
FIG. 9 is a flowchart relating to an operation of confirming the cryptocurrency payment in the information management system according to the first example embodiment of the present invention.

Next, with reference to the drawings, description is made on an operation of the information management system 1 according to the present example embodiment. FIG. 8 is a flowchart relating to processing of displaying a two-dimensional code for supporting cryptocurrency payment based on accounting information (also referred to as two-dimensional code display processing). FIG. 9 is a flowchart relating to processing of generating confirmation information of payment performed by a purchaser (also referred to as payment confirmation information generation processing).

<Two-Dimensional Code Display Processing>

First, with reference to the flowchart in FIG. 8, detailed description is made on the processing (two-dimensional code display processing) in which the information management system 1 displays a two-dimensional code for supporting cryptocurrency payment. In the following, constituent elements of the register device 10 are described as main bodies that operate the two-dimensional code display processing, but the register device 10 can be regarded as an operation main body.

In FIG. 8, first, the accounting information input unit 11 of the register device 10 inputs accounting information containing a purchased item and price information of the item (Step S111).

Subsequently, the code generation unit 14 acquires the conversion rate information stored in the rate information storage unit 12, and calculates the cryptocurrency payment amount from the accounting information based on rate information (Step S112). That is, the code generation unit 14 converts the accounting information into the cryptocurrency payment amount based on the rate information.

Then, the code generation unit 14 acquires the address information stored in the address information storage unit 13, and generates a two-dimensional code in which at least the cryptocurrency payment amount and the address information are recorded (Step S113).

Further, the code display unit 15 displays the two-dimensional code generated by the code generation unit 14 (Step S114).

The two-dimensional code display processing in FIG. 8 is as described above. When the two-dimensional code displayed in the two-dimensional code display processing is read by a terminal of the user, and the transaction information is generated appropriately, the transaction information is transmitted to a node that manages the cryptocurrency system.

<Payment Confirmation Information Generation Processing>

Next, with reference to the flowchart in FIG. 9, detailed description is made on the processing (payment confirmation information generation processing) in which the information management system 1 confirms the payment performed by the purchaser. In the following, constituent elements of the payment information confirmation device 20 are described as main bodies that operate the two-dimensional code display processing, but the payment information confirmation device 20 can be regarded as an operation main body.

First, the transaction information extraction unit 21 is connected to the cryptocurrency system management terminal 50, and extracts the transaction information that a remittance is made to the address information, through use of the address information stored in the address information storage unit 22 (Step S121).

Subsequently, the payment confirmation information transmitting unit 23 determines whether the number of extracted pieces of transaction information is one or more (Step S122).

In a case where the transaction information is not extracted (No in Step S122), the processing returns to Step S121, and extraction of the transaction information is repeated.

In contrast, in a case where the number of extracted pieces of the transaction information is one or more (Yes in Step S122), the payment confirmation information transmitting unit 23 generates payment confirmation information containing at least the cryptocurrency payment amount from the extracted transaction information (Step S123).

For example, when one transaction in which "0.0006 unit of the cryptocurrency" is paid to an address "1J7fmg4rcDzUNBMYzd48VWXL2rgKxEuXYz" is confirmed, the payment confirmation information transmitting unit 23 executes the processing in Step S123.

Then, the payment confirmation information transmitting unit 23 transmits the generated payment confirmation information to the payment confirmation information receiving unit 16 of the register device (Step S124).

The payment confirmation information generation processing in FIG. 9 is as described above. An employee of the vendor confirms the payment confirmation information received by the payment confirmation information receiving unit 16 of the register device 10, and determines whether the cryptocurrency payment amount contained in the payment confirmation information matches with a cryptocurrency payment amount that is actually required. For example, in a case where the cryptocurrency payment amount that is "0.0006 unit of the cryptocurrency" is required in Step S112, when the payment confirmation information contains that "0.0006 unit of the cryptocurrency" is actually paid, it can be determined that the payment in this transaction is completed.

For example, when the payment confirmation information contains a date and time when the transaction information is generated, the employee of the vendor compares the date and time when the processing in FIG. 8 is executed and the date and time when the transaction information is generated. When the employee of the vendor confirms that the date and time when the processing in FIG. 8 is executed and the date and time when the transaction information is generated are close to each other, it can be determined more accurately whether the payment for the present item transaction is completed.

Further, a payment number is recorded in the two-dimensional code in Step S113, and a payment number is confirmed to match with the payment number contained in the payment confirmation information.

With this, it can be determined more accurately whether the payment for the present item transaction is completed.

As described above, the register device in the present example embodiment generates the two-dimensional code in which the cryptocurrency payment amount and the address information of the account of the vendor are recorded, through use of the accounting information, the rate information, and the address information. The user can easily generate and transmit the transaction information by reading the displayed two-dimensional code with the terminal. The payment information confirmation device in the present example embodiment receives and extracts the transaction information to the vendor, and transmits the payment confirmation information containing the cryptocurrency payment amount generated from the transaction information, to the register device. Thus, the register device in the present example embodiment is capable of confirming the payment result of the cryptocurrency without being directly connected to the Internet.

That is, according to the present example embodiment, even when the register device without connection to the Internet is used, the point-of-sales information management system, which supports the cryptocurrency payment without providing a cryptocurrency payment support terminal for each sales counter, can be provided.

According to the system in the present example embodiment, the register in the point-of-sales information management system has both an accounting processing function and a cryptocurrency payment support function, and hence the point-of-sales information management system, which is capable of supporting the cryptocurrency payment more easily, can be provided. Thus, according to the present example embodiment, the cryptocurrency payment can be supported without degrading security of the register device.

Second Example Embodiment (Configuration)

Next, with reference to the drawings, description is made on a configuration of an information management system according to a second example embodiment of the present invention. The information management system is different from that in the first example embodiment in that register information for identifying a plurality of register devices is used. In the following, differences from the first example embodiment are mainly described, and overlapping description is omitted.

Figure 10:
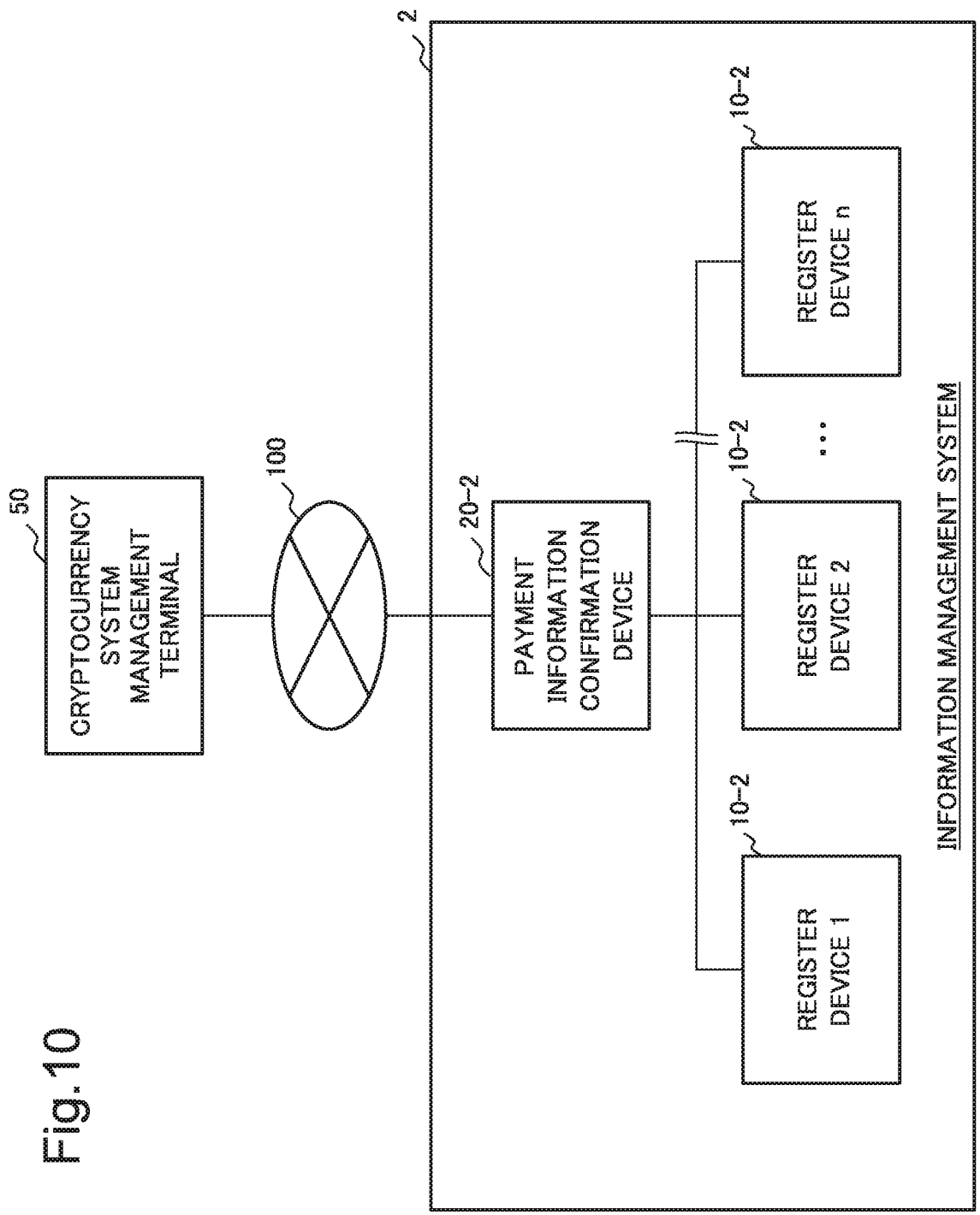
FIG. 10 is a block diagram illustrating a configuration example of an information management system according to a second example embodiment of the present invention.

FIG. 10 is a schematic diagram illustrating a configuration of an information management system 2 according to the present example embodiment. The information management system 2 includes a payment information confirmation device 20-2 and at least one register device 10-2. Note that, in FIG. 10, an example in which n (n: natural number) register devices 10-2 are included is given, but the number of register devices 10-2 is not limited.

Figure 11:
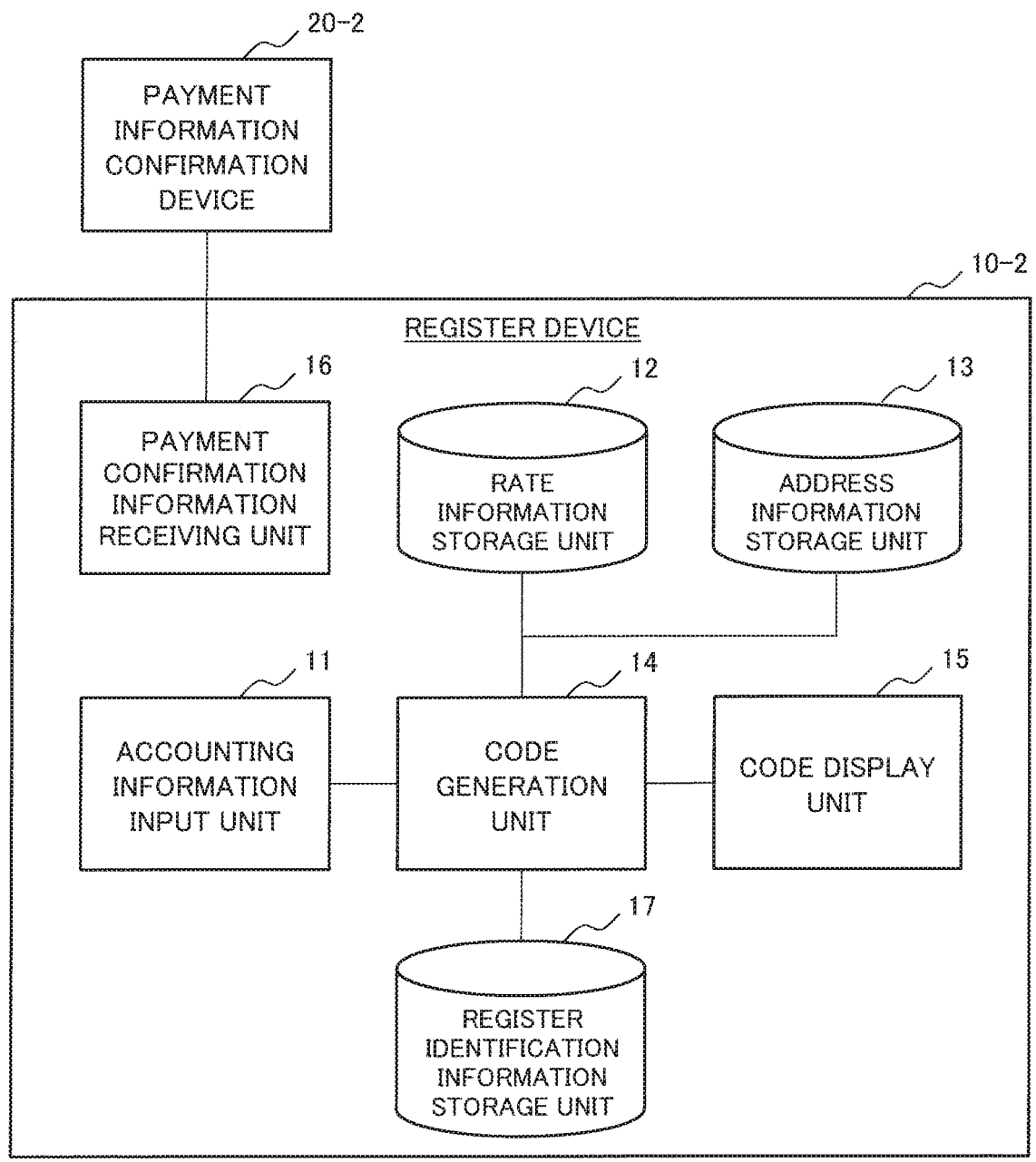
FIG. 11 is a block diagram illustrating a configuration of a register device in the information management system according to the second example embodiment of the present invention.
Figure 13:
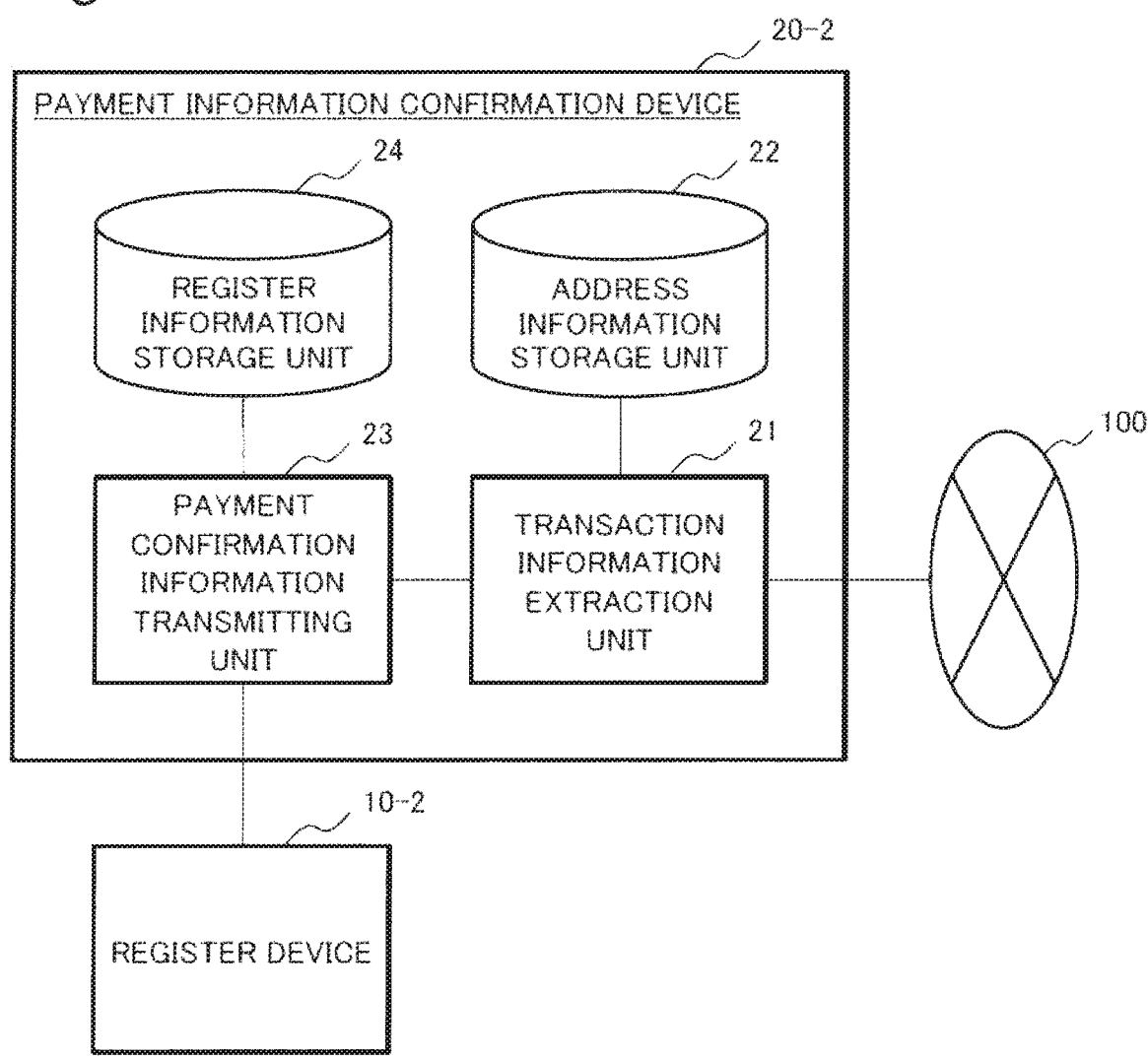
FIG. 13 is a block diagram illustrating a configuration of a payment information confirmation device in the information management system according to the second example embodiment of the present invention.

FIG. 11 is a block diagram for illustrating a configuration of the register device 10-2 in the information management system 2. FIG. 13 is a block diagram illustrating a configuration of the payment information confirmation device 20-2 in the information management system.

As in FIG. 11, the register device 10-2 includes a register identification information storage unit 17 in addition to an accounting information input unit 11, a rate information storage unit 12, an address information storage unit 13, a code generation unit 14, a code display unit 15, and a payment confirmation information receiving unit 16.

Figure 12:
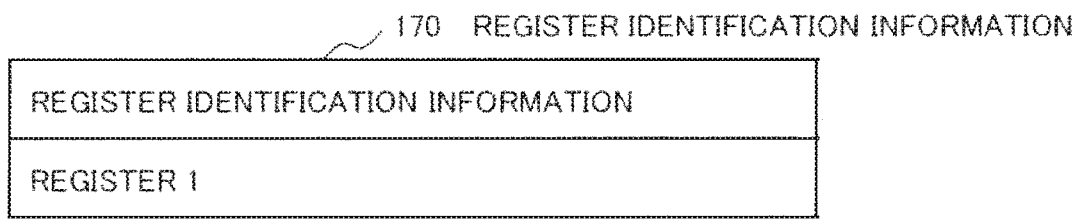
FIG. 12 is a schematic diagram illustrating one example of register identification information stored in a register identification information storage unit in the information management system according to the second example embodiment of the present invention.

In the register identification information storage unit 17, register identification information for identifying the register device 10-2 is stored. FIG. 12 is one example of register identification information 170 stored in the register identification information storage unit 17.

The code generation unit 14 generates a two-dimensional code in which, in addition to the cryptocurrency payment amount and the address information, the register identification information is recorded.

As in FIG. 13, the payment information confirmation device 20-2 includes a register information storage unit 24 in addition to a transaction information extraction unit 21, an address information storage unit 22, and a payment confirmation information transmitting unit 23.

Figures 14, 15:
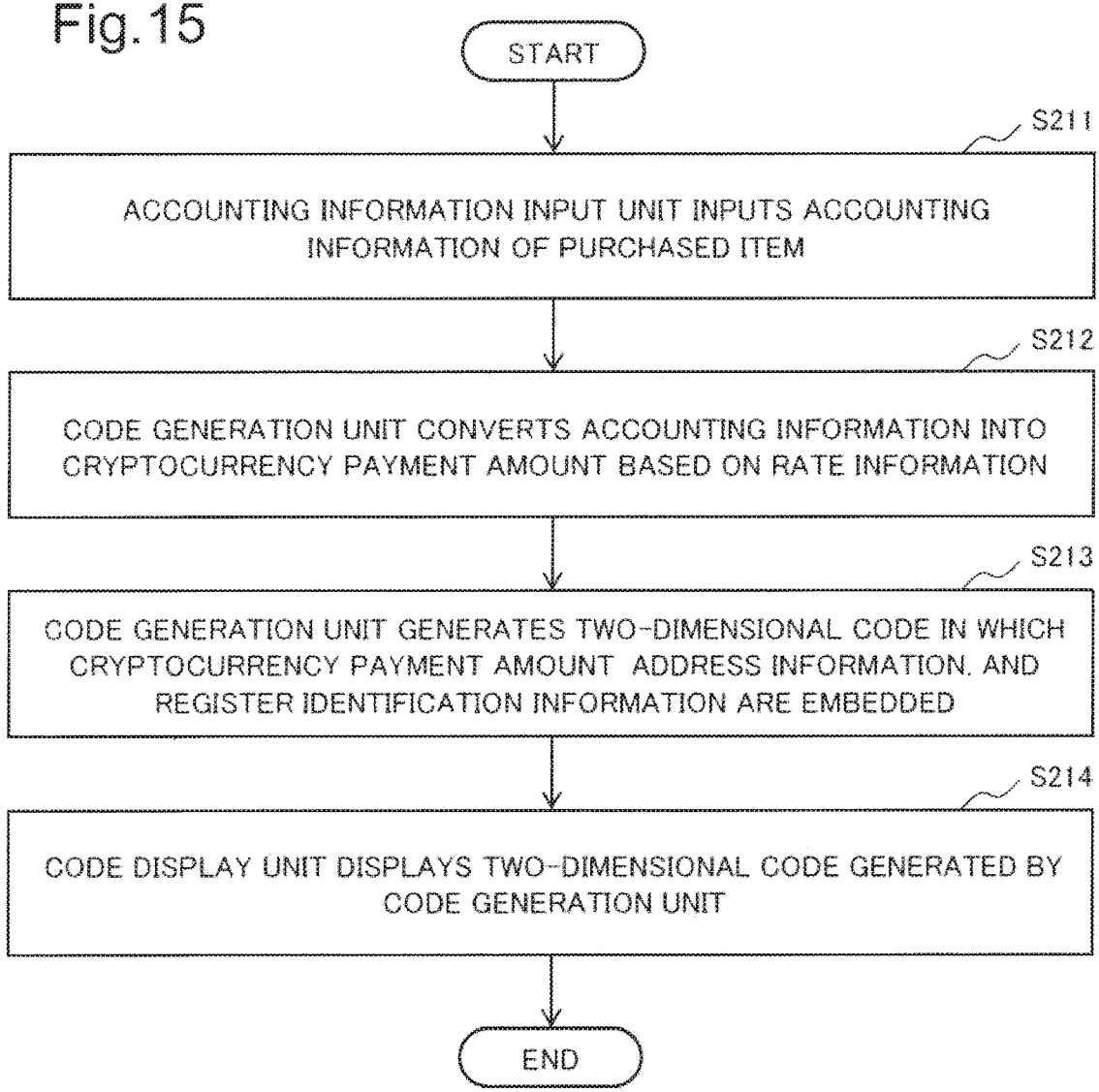
FIG. 14 is a schematic diagram illustrating one example of register information stored in a register information storage unit in the information management system according to the second example embodiment of the present invention.
FIG. 15 is a flowchart relating to an operation of displaying a two-dimensional code for supporting cryptocurrency payment in the information management system according to the second example embodiment of the present invention.

In the register information storage unit 24, a register address such as an Internet Protocol (IP) address for communicating with the register device 10-2 corresponding to the register identification information is stored. FIG. 14 is one example of register information 240 stored in the register information storage unit 24, which associates the register identification information and the register address with each other.

The payment confirmation information transmitting unit 23 selects the register device 10-2 to which the payment confirmation information is transmitted, based on the register identification information contained in the transaction information extracted by the transaction information extraction unit 21.

(Operation)

Figure 16:
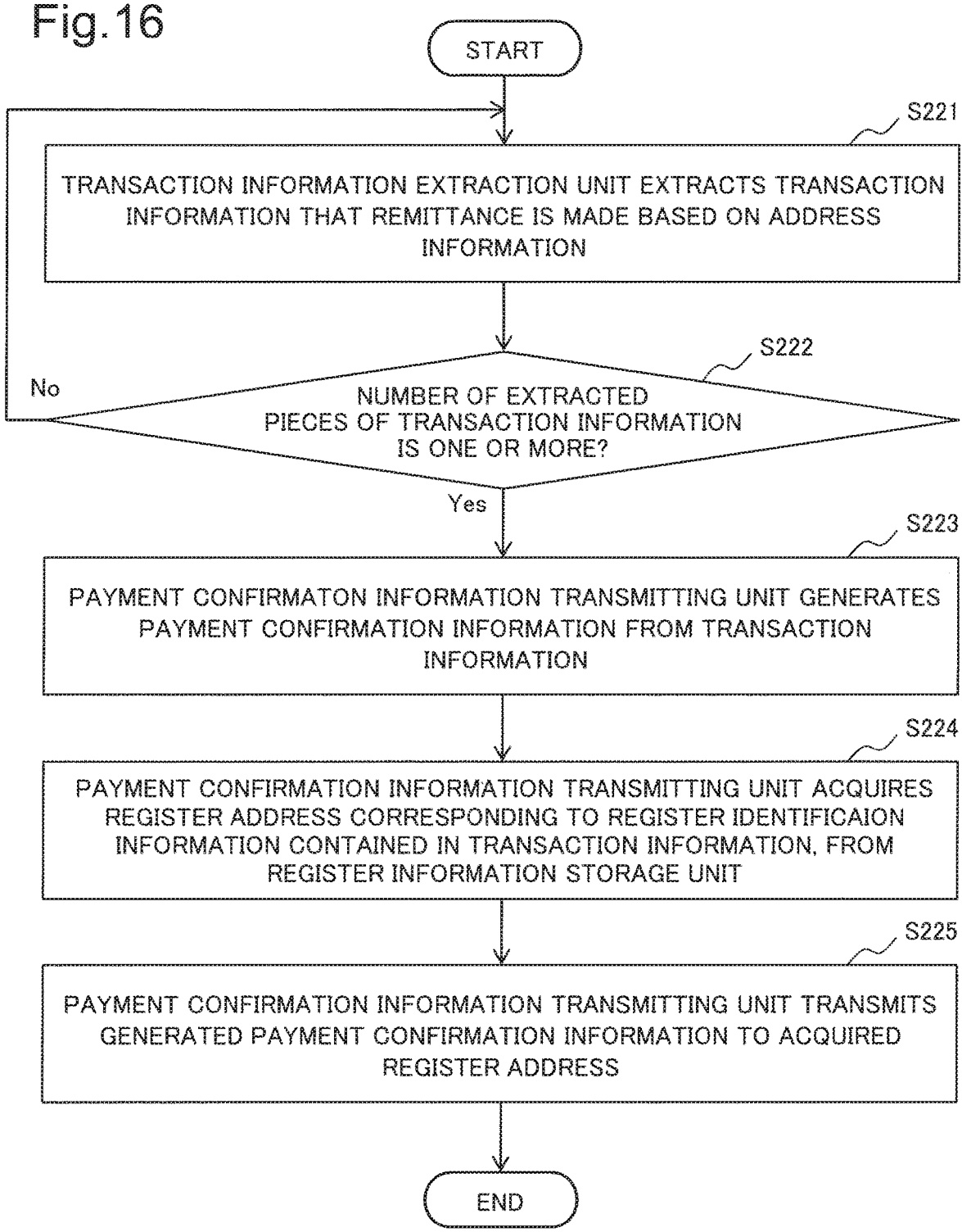
FIG. 16 is a flowchart relating to an operation of confirming the cryptocurrency payment in the information management system according to the second example embodiment of the present invention.

Next, with reference to the drawings, description is made on an operation of the information management system 2 according to the present example embodiment. FIG. 15 is a flowchart relating to processing of displaying a two-dimensional code for supporting cryptocurrency payment based on the accounting information (also referred to as two-dimensional code display processing). FIG. 16 is a flowchart relating to processing of generating confirmation information of payment performed by a purchaser (also referred to as payment confirmation information generation processing).

<Two-Dimensional Code Display Processing>

First, with reference to the flowchart in FIG. 15, detailed description is made on the processing (two-dimensional code display processing) in which the information management system according to the present example embodiment displays a two-dimensional code for supporting cryptocurrency payment. In the following, constituent elements of the register device 10-2 are described as main bodies that operate the two-dimensional code display processing, but the register device 10-2 can be regarded as an operation main body.

In FIG. 15, first, the accounting information input unit 11 of the register device 10-2 inputs accounting information containing a purchased item and price information of the item (Step S211).

Subsequently, the code generation unit 14 acquires the conversion rate information stored in the rate information storage unit 12, and calculates the cryptocurrency payment amount from the accounting information based on the rate information (Step S212). That is, the code generation unit 14 converts the accounting information into the cryptocurrency payment amount based on the rate information.

Then, the code generation unit 14 acquires the address information stored in the address information storage unit 13 and the register identification information stored in the register identification information storage unit 17. Then, the code generation unit 14 generates a two-dimensional code in which at least the cryptocurrency payment amount, the address information, and the register identification information are recorded (Step S213).

Further, the code display unit 15 displays the two-dimensional code generated by the code generation unit 14 (Step S214).

For example, when the register identification information as in FIG. 12 is stored in the register identification information storage unit 17, the code generation unit 14 converts a JSON form character string as in the following into a QR code. {"address": "1J7fmg4rcDzUNBMYzd48VWXL2rgKxEuXYz", "payment": "0.0006BTC", "register_id": "register1"}

The two-dimensional code display processing in FIG. 15 is as described above. When the two-dimensional code displayed in the two-dimensional code display processing is read by a terminal of the user, and the transaction information is generated appropriately, the transaction information is transmitted to a node that manages the cryptocurrency system.

<Payment Confirmation Information Generation Processing>

Next, with reference to the flowchart in FIG. 16, detailed description is made on the processing (payment confirmation information generation processing) in which the information management system according to the present example embodiment confirms the payment performed by the purchaser. In the following, constituent elements of the payment information confirmation device 20-2 are described as main bodies that operate the two-dimensional code display processing, but the payment information confirmation device 20-2 can be regarded as an operation main body.

First, the transaction information extraction unit 21 is connected to the cryptocurrency system management terminal 50, and extracts the transaction information that a remittance is made to the address information, through use of the address information stored in the address information storage unit 22 (Step S221).

Subsequently, the payment confirmation information transmitting unit 23 determines whether the number of extracted pieces of transaction information is one or more (Step S222).

In a case where the transaction information is not extracted (NO in Step S222), the processing returns to Step S221, and extraction of the transaction information is repeated.

In contrast, in a case where the number of extracted pieces of the transaction information is one or more (YES in Step S222), the payment confirmation information transmitting unit 23 generates payment confirmation information containing at least the cryptocurrency payment amount from the extracted transaction information (Step S223).

The payment confirmation information transmitting unit 23 acquires a register address corresponding to the register identification information contained in the extracted transaction information, from the register information storage unit 24 (Step S224).

Further, the payment confirmation information transmitting unit 23 transmits the generated payment confirmation information to the acquired register address (Step S225).

For example, it is assumed that the register information as in FIG. 14 is stored in the register information storage unit 24. In this case, the payment confirmation information transmitting unit 23 acquires a register address (for example, 128.0.0.10) corresponding to the register identification information (for example, register 1) contained in the transaction information, and transmits the payment confirmation information to the acquired register address.

The payment confirmation information generation processing in FIG. 16 is as described above. The employee of the vendor confirms the payment confirmation information received by the payment confirmation information receiving unit 16 of the register device 10-2, and determines whether the cryptocurrency payment amount contained in the payment confirmation information matches with a cryptocurrency payment amount that is actually required.

As described above, according to the present example embodiment, when the information management system is formed by the plurality of register devices, only the payment confirmation information relating to the register device with which the purchase is completed is notified. Thus, the payment can be confirmed more efficiently.

(Hardware Configuration)

Figure 17:
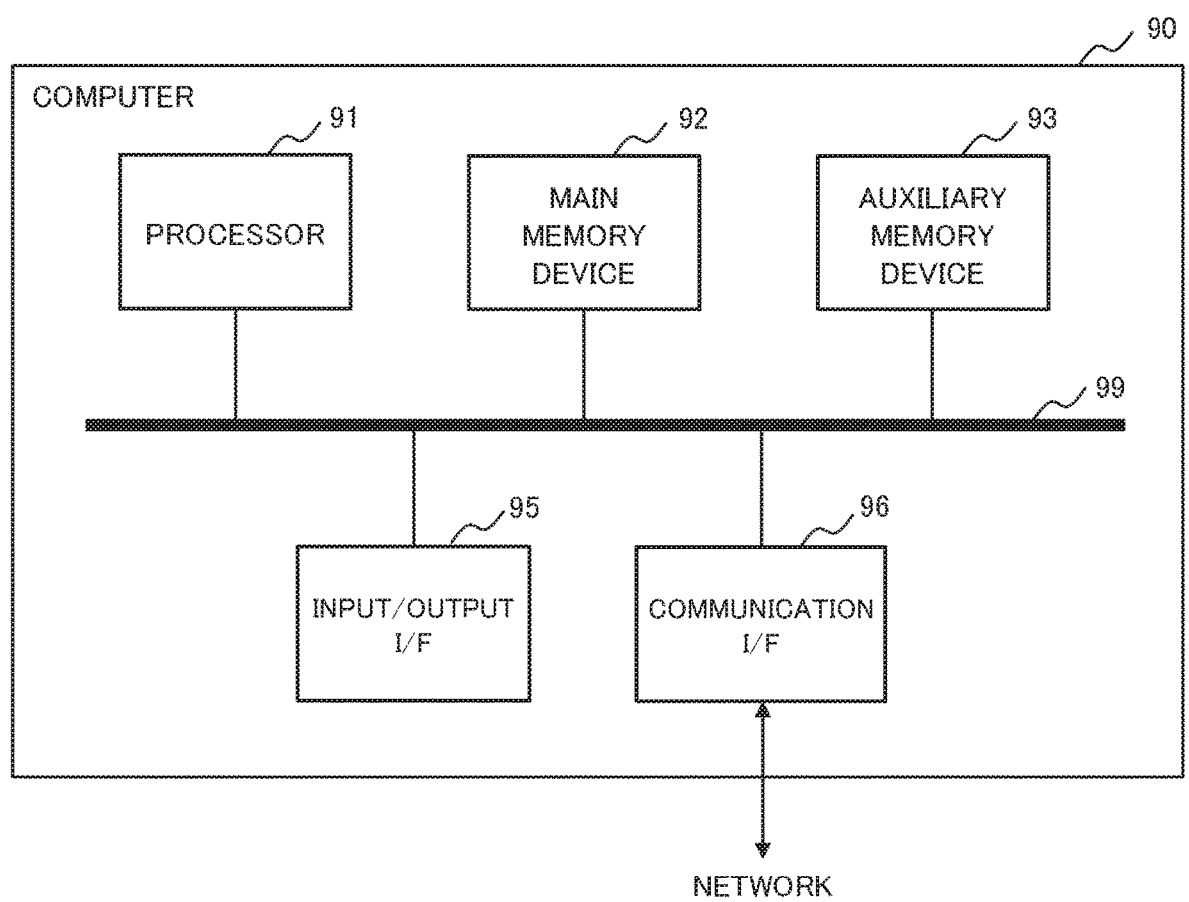
FIG. 17 is a block diagram illustrating one example of a hardware configuration of the information management device according to each example embodiment of the present invention.

Here, a hardware configuration for achieving the information management system according to each example embodiment of the present invention is described by giving a computer 90 in FIG. 17 as one example. Note that, the computer 90 in FIG. 17 is a configuration example for achieving the information management system according to each example embodiment, and is not intended to limit the scope of the present invention. Further, the information management system according to the present example embodiment may not include all the configurations illustrated in FIG. 17, and may include configurations not illustrated in FIG. 17.

As illustrated in FIG. 17, the computer 90 includes a processor 91, a main memory device 92, an auxiliary memory device 93, an input/output interface 95, and a communication interface 96. In FIG. 17, the interface is expressed as "I/F" in an abbreviated form. The processor 91, the main memory device 92, the auxiliary memory device 93, the input/output interface 95, and the communication interface 96 are connected to each other via a bus 99 in such a way as to be able to mutually transmit and receive data. Further, the processor 91, the main memory device 92, the auxiliary memory device 93, and the input/output interface 95 are connected to a network such as the Internet and the Intranet through the communication interface 96.

The processor 91 develops a program, which is stored in the auxiliary memory device 93 or the like, in the main memory device 92, and executes the developed program. Each example embodiment of the present invention may have a configuration that uses a software program installed in the computer 90. The processor 91 executes arithmetic processing and control processing that are executed by the information management system according to the present example embodiment.

The main memory device 92 has a region in which the program is developed. The main memory device 92 may be achieved, for example, by a volatile memory such as a dynamic random access memory (DRAM) and a nonvolatile memory such as a magnetoresistive random access memory (MRAM).

The auxiliary memory device 93 stores various data. The auxiliary memory device 93 is configured by a local disc such as a hard disc and a flash memory. Note that, the main memory device 92 may be configured to store various data, and the auxiliary memory device 93 may be omitted.

The input/output interface 95 connects the computer 90 and peripheral devices to each other based on connection standards of the computer 90 and the peripheral devices. The communication interface 96 is connected to a network such as the Internet and the Intranet based on standards and specifications. The input/output interface 95 and the communication interface 96 may be shared as an interface for connecting to external devices.

Further, the computer 90 may be configured in such a way as to be connected with input devices such as a keyboard, a mouse, and a touch panel as needed. Such input devices are used for inputting information and setting. In a case where the touch panel is used as an input device, a display screen of a display device may have a configuration to also function as an interface of the input device. Transmission and receipt of the data between the processor 91 and the input device is performed through the input/output interface 95. Further, the computer 90 may be provided with a display device for displaying image information. The display device is connected to the computer 90 through the input/output interface 95.

The communication interface 96 is connected to an external system or device via a network. The communication interface 96 may be configured to have a wireless communication function and transmit and receive various data through wireless communication.

Further, the computer 90 may be provided with a reader/writer as needed. The reader/writer is connected to the bus 99. Between the processor 91 and a recording medium (program recording medium), not shown, the reader/writer mediates reading of data and a program from the recording medium and writing of results of processing of the computer 90 to the recording medium, for example. The recording medium may be achieved, for example, by a semiconductor recording medium such as a universal serial bus (USB) memory and a secure digital (SD) card. Further, the recording medium may be achieved by a magnetic recording medium such as a flexible disc, an optical recording medium such as a compact disc (CD) and a digital versatile disc (DVD), and other recording media.

One example of the hardware configuration for achieving the information management system according to each example embodiment of the present invention is as described above. At least any of the elements constituting the information management system according to each example embodiment of the present invention is achieved by the computer 90 in FIG. 17. For example, the elements constituting the information management system according to each example embodiment of the present invention are achieved by software operated in the computer 90 in FIG. 17. Further, the elements constituting the information management system according to each example embodiment of the present invention may be achieved by a circuit having functions of the constituent elements.

Further, the program, which causes the computer to execute the processing of the information management system according to each example embodiment of the present invention, is included in the scope of the present invention. Moreover, the program recording medium that records the program according to each example embodiments of the present invention is also included in the scope of the present invention.

With reference to the example embodiments, the present invention is described above, but the present invention is not limited to the above-mentioned example embodiments. Various changes that can be understood by a person skilled in the art can be made to the configurations and details of the present invention within the scope of the present invention.

REFERENCE SIGNS LIST 1, 2 Information management system
10 Register device
11 Accounting information input unit
12 Rate information storage unit
13 Address information storage unit
14 Code generation unit
15 Code display unit
16 Payment confirmation information receiving unit
17 Register identification information storage unit
20 Payment information confirmation device
21 Transaction information extraction unit
22 Address information storage unit
23 Payment confirmation information transmitting unit 24 Register information storage unit
50 Cryptocurrency system management terminal

What is claimed is:

1. An information management system for managing point-of-sales information, comprising:
   a payment information confirmation device configured to be connected to a cryptocurrency system management terminal managing a cryptocurrency system via a network, and configured to extract transaction information containing address information of an account of a vendor in the cryptocurrency system, and generate and transmit payment confirmation information containing at least a remittance amount from the extracted transaction information; and
   a register device configured to be connected to the payment information confirmation device and not directly connected to the Internet, and configured to receive the payment confirmation information from the payment information confirmation device, display the received payment confirmation information, convert a currency unit of an input transaction amount into a cryptocurrency unit payment amount of the currency unit in the cryptocurrency system, generate a two-dimensional code in which the cryptocurrency unit payment amount and the address information are recorded, and display the generated two-dimensional code.

2. The information management system according to claim 1, wherein
   the register device includes at least one memory storing instructions; and at least one processor connected to the at least one memory and configured to execute the instructions to:
   input accounting information containing at least a price of an item which a user purchases;
   store conversion rate information for a currency unit used for the accounting information and a cryptocurrency in the cryptocurrency system;
   store the address information;
   convert the currency unit used in the accounting information into the currency unit in the cryptocurrency system, based on the conversion rate information;
   determine the cryptocurrency unit payment amount;
   generate the two-dimensional code in which the determined cryptocurrency unit payment amount and the address information stored in the register device are recorded; and
   display the generated two-dimensional code.

3. The information management system according to claim 2, wherein
   the payment information confirmation device includes at least one memory storing instructions; and at least one processor connected to the at least one memory and configured to execute the instructions to:
   store the address information;
   extract the transaction information for the vendor, based on the address information stored in the payment information confirmation device;
   generate the payment confirmation information containing at least the remittance amount from the extracted transaction information; and
   transmit the generated payment confirmation information to the register device, and
   the least one processor included in the register device is configured to execute the instructions to:
   receive the payment confirmation information containing a confirmation result of payment by the cryptocurrency, from the payment information confirmation device.

4. The information management system according to claim 3, wherein
   the least one processor included in the payment information confirmation device is configured to execute the instructions to:
   extract a generation date and a time of the transaction information from the transaction information, and
   cause the payment confirmation information to contain the generation date and the time of the extracted transaction information.

5. The information management system according to claim 4, wherein
   the least one processor included in the payment information confirmation device is configured to execute the instructions to:
   extract an identifier of the transaction information from the transaction information, and
   cause the payment confirmation information to contain the identifier of the extracted transaction information.

6. The information management system according to claim 5, wherein
   the least one processor included in the payment information confirmation device is configured to execute the instructions to:
   extract the transaction information, based on any of the generation date and the time of the transaction information and the identifier of the transaction information.

7. The information management system according to claim 3, further comprising:
   a plurality of the register devices, wherein
   at least one of the register devices is configured to:
   store register identification information for identifying the register device; and
   generate the two-dimensional code in which the register identification information is recorded in addition to the cryptocurrency unit payment amount and the address information.

8. The information management system according to claim 7, wherein
   the payment information confirmation device is configured to:
   store a register address for communicating with the register device corresponding to the register identification information, and
   select the register device to which the payment confirmation information is transmitted, based on the register identification information contained in the extracted transaction information.

9. An information management method for managing point-of-sales information, comprising:
   receiving accounting information which contains at least a price of an item which a user purchases by using a register device that is not directly connected to the Internet;
   converting a currency unit of a payment amount included in the accounting information into a cryptocurrency unit payment amount of the currency unit in a cryptocurrency system;

generating a two-dimensional code in which the cryptocurrency unit payment amount and address information of an account of a vender in the cryptocurrency system are recorded;

displaying the generated two-dimensional code;

extracting transaction information containing the address information via a network;

generating payment confirmation information containing at least a remittance amount from the extracted transaction information; and displaying the generated payment confirmation information.

10. A non-transitory program recording medium which records a program for managing point-of-sales information, the program causing a computer to execute:

processing of receiving accounting information which contains at least a price of an item which a user purchases by using a register device that is not directly connected to the Internet;

processing of converting a currency unit of a payment amount included in the accounting information into a cryptocurrency unit payment amount of the currency unit in a cryptocurrency system;

processing of generating a two-dimensional code in which the cryptocurrency unit payment amount and address information of an account of a vender in the cryptocurrency system are recorded;

processing of displaying the generated two-dimensional code;

processing of extracting transaction information containing the address information via a network;

processing of generating payment confirmation information containing at least a remittance amount from the extracted transaction information; and processing of displaying the generated payment confirmation information.

\* \* \* \* \*